(12) United States Patent
Kleber et al.

(10) Patent No.: US 8,575,813 B2
(45) Date of Patent: Nov. 5, 2013

(54) INDUCTION ROTOR HAVING IMPROVED CONDUCTOR BAR PROFILES AND METHOD FOR FORMING THE SAME

(75) Inventors: Richard M. Kleber, Clarkston, MI (US); Michael J. Walker, Windsor (CA)

(73) Assignee: GM Global Technology Operations LLC, Detroit, MI (US)

( * ) Notice: Subject to any disclaimer, the term of this patent is extended or adjusted under 35 U.S.C. 154(b) by 418 days.

(21) Appl. No.: 12/971,058

(22) Filed: Dec. 17, 2010

(65) Prior Publication Data

US 2012/0153766 A1 Jun. 21, 2012

(51) Int. Cl.
| H02K 17/00 | (2006.01) |
| H02K 17/02 | (2006.01) |
| H02K 17/16 | (2006.01) |
| H02K 19/14 | (2006.01) |

(52) U.S. Cl.
USPC . 310/211; 310/125; 310/156.78; 310/156.81; 310/166; 310/212

(58) Field of Classification Search
USPC ........ 310/125, 156.78, 156.81, 166, 211, 212
See application file for complete search history.

(56) References Cited

U.S. PATENT DOCUMENTS

| 3,509,397 | A | * | 4/1970 | Diamant | 310/212 |
| 3,685,142 | A | * | 8/1972 | Deming | 29/598 |
| 3,826,940 | A | * | 7/1974 | McKean et al. | 310/211 |
| 4,249,098 | A | * | 2/1981 | Karlen et al. | 310/183 |
| 4,309,635 | A | * | 1/1982 | Sei et al. | 310/211 |
| 5,729,885 | A | * | 3/1998 | Carosa et al. | 29/598 |
| 2003/0102762 | A1 | * | 6/2003 | Jansen et al. | 310/211 |
| 2004/0139596 | A1 | * | 7/2004 | Hsu | 29/598 |
| 2006/0066169 | A1 | * | 3/2006 | Daugherty et al. | 310/216 |
| 2006/0273683 | A1 | * | 12/2006 | Caprio et al. | 310/211 |
| 2012/0126656 | A1 | * | 5/2012 | Gerard et al. | 310/211 |

* cited by examiner

*Primary Examiner* — Terrance Kenerly
(74) *Attorney, Agent, or Firm* — Parks IP Law LLC

(57) ABSTRACT

A rotor core for an induction motor. The rotor core includes a body that at least (i) extends axially from an outer surface of the body inward toward a central axis, (ii) extends from a first axial end to a second axial end, and (iii) defines a plurality of internal grooves. Further, each groove at least (iv) includes an opening at the outer surface of the body, (v) is defined by two opposing walls, (vi) extends from the first axial end to the second axial end, (vii) extends axially between the opening at the exterior surface and an inward end, and (viii) includes a body section. And wherein (ix) at least one wall of the opposing walls of the groove includes, in the body section of the groove, an extended segment forming a portion of increased breadth for the groove.

11 Claims, 8 Drawing Sheets

INDUCTION ROTOR HAVING IMPROVED CONDUCTOR BAR PROFILES AND METHOD FOR FORMING THE SAME

TECHNICAL FIELD

The present disclosure relates generally to induction motors and, more particularly, to improved conductor-bar profiles for rotors of induction motors, and methods for forming the same.

BACKGROUND

Alternating Current (AC) induction motors are a type of electric motor used in a variety of applications such as in electric vehicles. Induction motors are also commonly used in products to drive devices such as fans, pumps, and compressors, and in manufacturing processes to drive conveyor belts, saws, and other machinery.

In induction motors, current is induced in a rotor component of the motor by way of electromagnetic induction created by a stator component rotating around the rotor. Induction motors are sometimes referred to as asynchronous motors because an effective speed of a magnetic field created by the stator must be different than a speed of the rotor to induce current in conductor bars of the rotor, and thereby cause the rotor to rotate.

Turning to the figures, and more particularly to the first figure, FIG. 1 shows a portion of a rotor assembly 100 of an AC induction motor. The rotor 100 includes a generally cylindrical rotor core 102 having a series of identical conductor-bar slots, or grooves 104 spaced periodically around a perimeter of the rotor core 102.

Though not shown in detail, the rotor core 102 is typically a laminate having a plurality of generally concentric thin plates of highly-magnetic steel. For this reason, the rotor core 102 can be referred to as a stack. The rotor 100 also includes annular shorting bars 106, 108 capping each axial end of the rotor core 102, with reference to rotor axis A.

In production, the rotor core 102 is placed into a die casting machine for the casting of the shorting bars 106, 108, and of conductor bars formed in the grooves 104 (an exemplary conductor bar 300 is shown in FIG. 3). It will be appreciated that, being formed in the rotor grooves 104, the conductor bars generally take the shape of the grooves 104.

FIG. 2 shows a cross section of the rotor core 102 and its grooves 104. FIG. 3 shows an exemplary corresponding conductor bar 300 formed in each groove 104. The shorting bars 106, 108 (not shown in FIG. 2) and the conductor bars 300 include a conductive metal, such as aluminum or, more conductive, copper. Other exemplary materials include aluminum alloys and copper alloys, such as bronze.

As part of manufacturing the rotor 100, the rotor core 102 is typically placed in a die-casting mold. In many cases, the rotor core 102 is placed in the die-casting mold at a vertical orientation—i.e., with the axis A (FIG. 1) of the rotor core 102 oriented generally vertically. Molten conductive material is first introduced at a bottom of the mold adjacent a first of the annular shorting bars 106 (FIG. 1). As more molten material is injected or otherwise introduced into the mold, pressure of the injection pushes the molten material up though the grooves 104 of the rotor core 102 to begin forming the conductive bars 300. With additional injection, the molten material reaches a top end of the mold to starting forming the other annular shorting bar 108 (FIG. 1). In other cases, the rotor core 102 is placed in the die-casting mold at a horizontal orientation—i.e., with the axis A (FIG. 1) of the rotor core 102 oriented generally horizontally. Molten conductive material is first introduced at a first end of the mold and injection is continued until the conductor bars 300 and shorting bars 106, 108 are filled. In either case, the completed conducting bars 300 electrically and structurally connect the completed shorting bars 106, 108.

With further reference to FIG. 2, it can be seen that the grooves 104 may include a more narrow portion 114 adjacent an outer surface 116 of the rotor core 102 and wider portion 118 distal to the outer surface 116, and closer to the axis A (FIG. 1) of the rotor core 102. Accordingly, the conducting bars 300 (FIG. 3) formed in the grooves 104 include a corresponding narrow proximate portion 314 and wider distal portion 318 (as shown in FIG. 3).

In some embodiments, sides 120 of the grooves 104 are generally straight, and so corresponding sides 320 of the conducting bars 300 are likewise. In some embodiments, the sides 120 are generally parallel, and in some particular embodiments opposing sides 120 of the same groove taper slightly toward each other.

The grooves 104 extend radially inward in the rotor core 102 from the exterior surface 116 to a distal end 122. The distal end 122 typically has a radius $R_1$. Thus, a distal end 322 of the conductor bars 300 has a corresponding radius $R_3$ (as show in FIG. 3).

A challenge in casting rotors 100 has long been forming the shorting bars 106, 108 and conducting bars 300 to have high and uniform density. The primary hindrances to this goal are voids and other discontinuities formed in the bars 300 as the molten material is forced through the cast, from the relatively-large volume of the first shorting bar 106, through the relatively-narrow confines of the conductor bar grooves 104, and into the relatively-large volume of the second end of the rotor core 102 to form the second shorting bar 108. Discontinuities limit performance of the resulting structure by lowering effective conductivity and structural integrity of the shorting and conductor bars 106, 108, 300.

One particular cause of discontinuities in the conducting bars 300 is partial solidification of molten material from exposure to relatively-cool surfaces of the grooves 104 during the injection process. The prematurely solidified material causes discontinuities in the conductor bars 104, and/or makes its way to the second shorting bar 108 causing discontinuities there.

Another cause of discontinuities is solidification shrinkage and metal contraction. As the metal transforms from a liquid, or molten state, to a solid (solidifies) from the molten state to the solid state, a specific volume of the metal decreases—i.e., it shrinks. This shrinkage can manifest itself in the form of porosity, usually along grain boundaries of the material, often forming crack-like voids. Areas last to solidify are prone to form shrinkage voids because there is insufficient metal to fill the space made available due to the change in volume. Also the reduction in volume during solidification and lowering of temperature produces tensile stresses on the constrained conductors (i.e., bars), tending to tear the conductor apart. Further, a geometric factor, such as an abrupt decrease in cross-sectional size of a passage in which the material is flowing, or a marked change in flow direction, can cause the voids created by solidification shrinkage to be concentrated in a particular area because the shrinkage, at a threshold, is pulling the material in two different directions while it is still in the semi-solid state.

Analyses of mold flow shows flow being impeded at interfaces of the flow path, such as between the relatively-larger cast area forming the shorting bar 106 and the more-confined area of the rotor grooves 104. Turbulence caused by this impedance can extend partially, fully along a length of the conductor bars being formed, or even all the way into the second shorting bar 108. Discontinuities caused by the turbulence result in poor casting quality in that mechanical and electrical characteristics of the rotor are compromised.

SUMMARY

The present disclosure relates to a rotor core for an induction motor. The rotor core includes a body that at least (i) extends axially from an outer surface of the body inward toward a central axis, (ii) extends from a first axial end to a second axial end, and (iii) defines a plurality of internal grooves. Further, each groove at least (iv) includes an opening at the outer surface of the body, (v) is defined by two opposing walls, (vi) extends from the first axial end to the second axial end, (vii) extends axially between the opening at the exterior surface and an inward end, and (viii) includes a body section. And wherein (ix) at least one wall of the opposing walls of the groove includes, in the body section of the groove, an extended segment forming a portion of increased breadth for the groove.

In another aspect, the present disclosure relates to a rotor for an induction motor. The rotor includes a rotor core having a body that at least: (1) extends axially from an outer surface of the body inward toward a central axis, (2) extends from a first axial end to a second axial end, and (3) defines a plurality of internal grooves. Further, each groove at least (4) includes an opening at the outer surface of the body, (5) is defined by two opposing walls, (6) extends from the first axial end to the second axial end, (7) extends axially between the opening at the exterior surface and an inward end, and (8) includes a body section. And wherein (9) at least one wall of the opposing walls of the groove includes, in the body section of the groove, an extended segment forming a portion of increased breadth for the groove.

In another aspect, the present disclosure relates to a method for making a rotor for an induction motor. The method includes positioning in a cast a rotor core having a plurality of grooves, wherein each groove has a body section, each groove has two opposing walls in the body section, and at least one wall of the opposing walls includes, in the body section of the groove, an extended segment forming a portion of increased breadth for the groove. The method also includes introducing molten material into the mold so as to fill the grooves, including the portions of extended breadth in the grooves, with the molten material, thereby forming conductor bars, each conductor bar being sized and shaped like the groove in which it is formed.

Other aspects of the present invention will be in part apparent and in part pointed out hereinafter.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to employ the present disclosure.

Overview of the Disclosure

In various embodiments, the present disclosure describes a magnetic core for a rotor having improved conductor bar profiles. By way of the improved conductor bar profiles, conductor bars having improved conductivity and structural properties are formed, as described in further detail below.

General Principles

Figure 2:
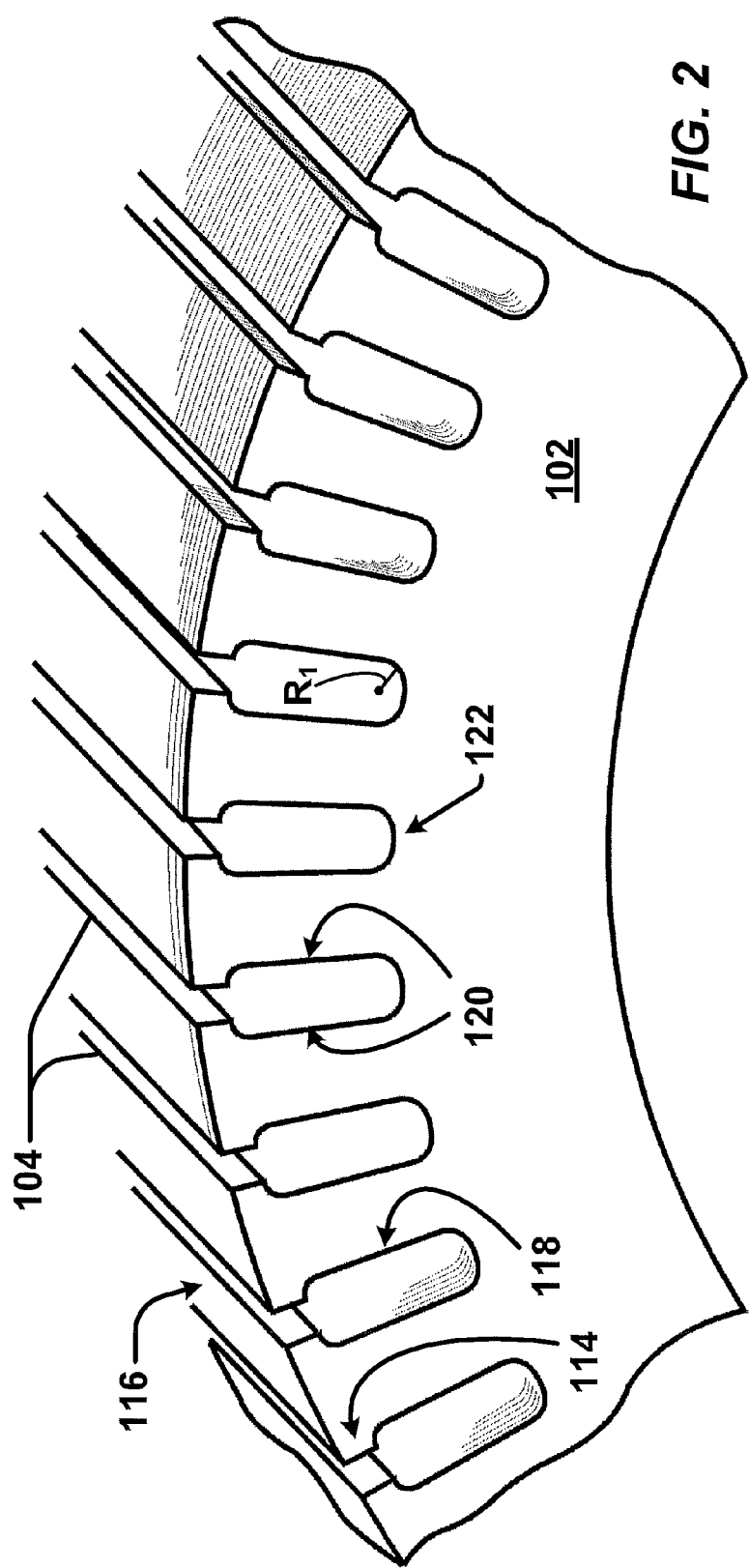
FIG. 2 is a partial cross-sectional view of the rotor core shown in FIG. 1.

The aforementioned challenge of improving performance of induction motors by improving casting flow and solidification of the flow, and thereby increasing conductivity characteristics of inductor bars has been long unaddressed. Although simply increasing cross-sectional profiles of the conductor bar grooves (e.g., grooves 104 shown in FIG. 2) from top to bottom (i.e., radially-proximate to radially-distal ends) would tend to decrease discontinuities in the conductor bars formed in the grooves, the power that can be generated by rotors including conductor bars having such generalized size increases would be limited in proportion to the broad increases in conductor bar size.

The present disclosure presents methods for forming rotors for induction motors having limited discontinuities in the conductor and shorting bars while maintaining desired power capabilities for the motor. As previously described, power that can be produced by an induction motor generally increases with a decrease in the cross-sectional size of the conductor bars. The present technology facilitates improved microstructure of rotor conductor bars for enabling desired conductivity and mechanical properties. More particularly, the present technology affords the sought balance, between increasing the density of conductor and shorting bars and maintaining desired overall power characteristics for the rotor, by improving flow of conductor and shorting-bar material without unduly increasing a size of the resulting conductor bars.

More particularly, the present technology facilitates flow of molten conductor and shorting-bar material through a rotor casting mold without over-increasing conductor-bar profiles by providing one or more strategically positioned local areas of increased breadth in each conductor bar grooves of the rotor core. The portions of increased breadth may also be referred to as portions of increased cross sectional area (ICSA). Characteristics of the portion(s) of increased breadth, such as location, number, size, and shape of increased breadth, are selected to accomplish the desired balance between increasing the density of conductor and shorting bars and maintaining desired overall power characteristics for the rotor.

Factors considered in selecting characteristics of the new groove profiles include behavior of molten conductor and shorting-bar materials being injected though the rotor casting mold during manufacture, a number of discontinuities expected to be formed in the conductor and shorting bars, and an amount of power that can be generated from the resulting rotor. Characteristics of the groove profiles include size, shape, and location of portion of increased groove breadth. Behavior of the molten material includes the likelihood that portions of the material will prematurely solidify, when and where such solidification will occur, and expected destinations and effects of such prematurely solidifying material.

Another benefit of, and potential factor in designing grooves to have portions of increased breadth is that the larger cross-sectional area of the resulting passage decreases an amount of time required to fill the mold (not shown in detail) with the molten material. Accordingly, a more complete fill can be achieved in less time. Also, by increasing the amount of flow through these localized passages, less metal will be partially solidified during filling. The molten metal can also then better fill the remaining portion of the groove radially rather than axially. Thus, defects caused by poor bonding of pre-solidified metal is reduced or eliminated.

The increased breath of the bulge will tend to solidify later than the narrow portion of the grooves and thus the solidification shrinkage will tend to form in the center of the bulge, and thus the narrow portion will have a more continuous structure with better electrical and mechanical properties. Furthermore, the increased cross section of the bulges will increase the overall strength of the conductor.

In some cases, portions of increased breadth are formed by an extension (e.g., bowing) of one wall of the groove, opposed by an unchanged opposite groove wall. In other cases, portions of increased breadth are formed by opposing extensions, in the opposing walls of the groove. In one particular contemplated embodiment (not shown in detail), for instance, the groove includes two portions of increased breadth, one formed by two opposing extensions of the wall at a first radial location along a height of the conductor bar, and another formed by a single, unopposed, extension of only one of the groove walls. Number and locations of wall extensions forming the portions of extended breadth are discussed in further detail below in connection with the exemplary embodiments shown in FIGS. 4-8.

The wall extensions may be configured to form portions of extended breadth having any of a variety of sizes and profile shapes without departing from the scope of the present invention. The size and shape of portions of extended groove breadth are also discussed in further detail below in connection with the exemplary embodiments shown in FIGS. 4-8.

Figure 3:
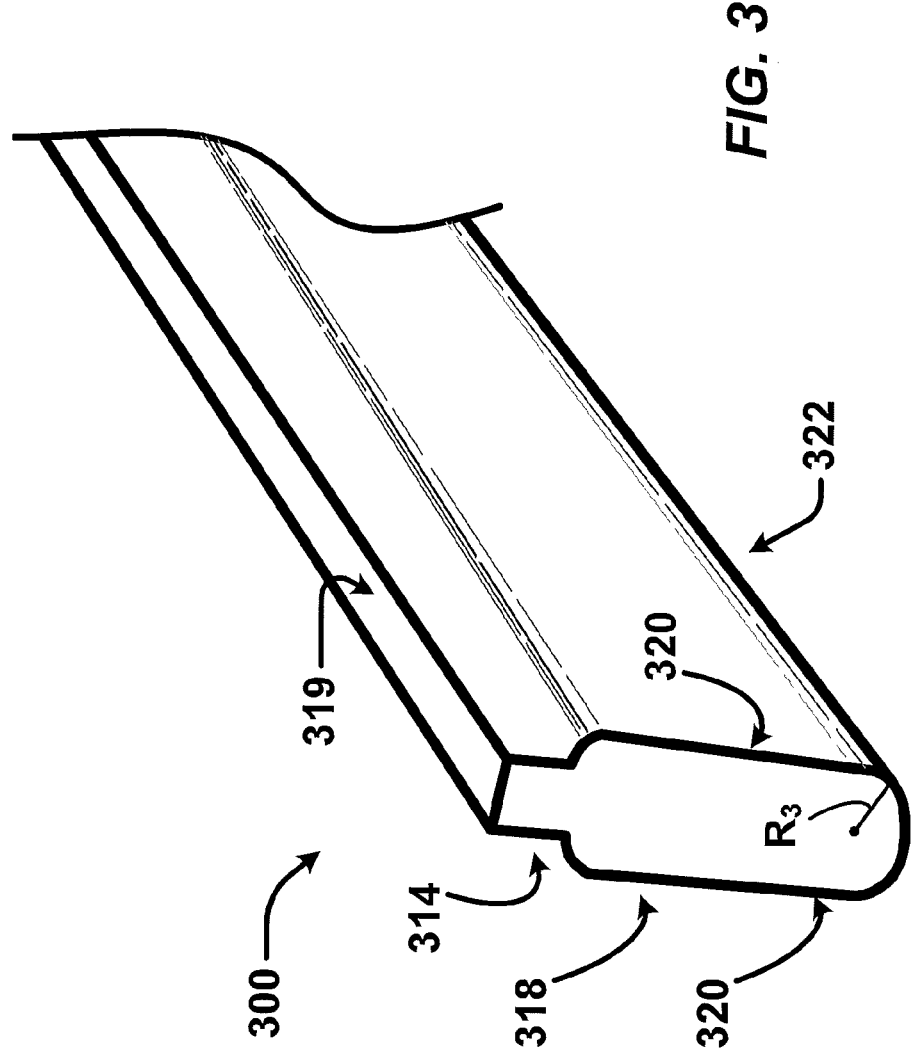
FIG. 3 is a perspective view of a conductor bar formed in grooves of the rotor core shown in FIG. 1.

In some embodiments, portions of increased breadth are provided in a body section of the groove, radially inward from a neck section, which is adjacent an exterior surface of the rotor. Accordingly, conductor bars formed in the grooves will have a corresponding relatively-thin neck section adjacent the rotor surface. For instance, in these embodiments, the neck section of the grooves may remain substantially the same as those shown in FIG. 2 and the neck section of the corresponding conductor bars may remain substantially the same as that shown in FIG. 3. Accordingly, a shape and a size of a part of the conductor bar exposed at the exterior surface of the completed rotor would remain generally the same as that associated with the illustrated components of FIGS. 1-3. In this way, the interface between the resulting rotor of the motor and a stator of the motor (not shown) remain generally unchanged.

In some embodiments, portions of increased breadth are provided in a body section of the groove and the groove does not include a radially outward neck section adjacent an exterior surface of the rotor.

In some embodiments of the present disclosure, a width of the body section of the groove, and so of the resulting conductor bars, is kept generally the same except at the localized portion(s) of increased breadth. For instance, in embodiments in which a single localized portion of increased breadth is provided intermediate the radially-proximate, neck section and radially-distal, bottom part of each groove (e.g., generally at a center of the conductor bar profile), the groove could otherwise maintain generally a traditional groove width (e.g., in the body section adjacent the neck section and in the body section adjacent a radially-distal terminal end). In this way, a profile of the radially-distal, bottom part of each groove remains generally the same as that of the traditional design.

Figure 6:
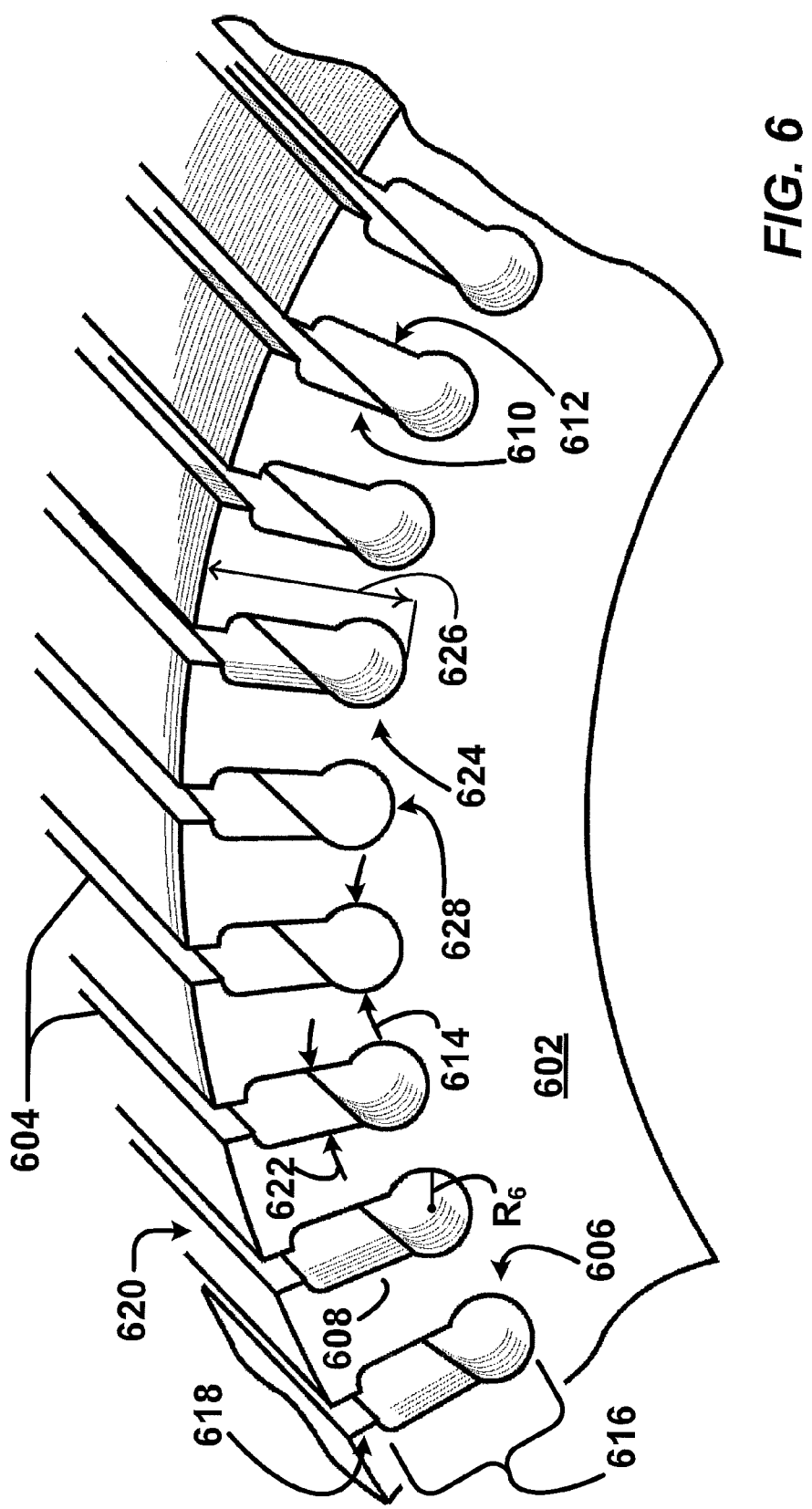
FIG. 6 is a partial cross-sectional view of yet another exemplary rotor core for the rotor of FIG. 1, according to an exemplary embodiment of the present disclosure.

As another example of selectively maintaining traditional groove widths, in embodiments in which a single localized portion of increased breadth is provided at a radially-distal, innermost, end of the groove, the groove could otherwise maintain generally a traditional groove width (e.g., from the portion of increase breadth to a radially-distal terminal end). An example of this embodiment is shown in FIG. 6.

In addition to designing the rotor grooves to include one or more localized portions of increased breadth, a depth of the grooves measured between the rotor surface and a radially-inward distal end of the grooves can be advantageously selected to accomplish the stated goals of facilitating effective flow of molten conductor and shorting-bar material through a rotor casting mold without over-increasing conductor-bar profiles. Considering the aforementioned principle that the power that can be generated by the motor is inversely proportional to the cross-sectional area of the conductor bars, the depth of the grooves, and thus a height of the conductor bars formed in them, is only increased to an extent that it is determined that the increase, along with any localized increases in breadth, accomplish the desired balance of improved flow and density with achievable power characteristics. Height qualities of the rotor grooves, and so of the conductor bars, are discussed in further detail below in connection with the exemplary embodiments shown in FIGS. 4-8.

In one contemplated embodiment (not shown in detail), two or more of the grooves of the rotor, and so two or more of the conductor bars formed therein, have profiles differing from each other. For instance, the rotor core can include two, three, or four different groove profiles, each including at least one portion of extended breadth. The different profiles could be distributed in a variety of ways without departing from the scope of the present invention, such as by being distributed around the rotor core in a regular pattern.

First Exemplary Rotor Core

Figure 4:
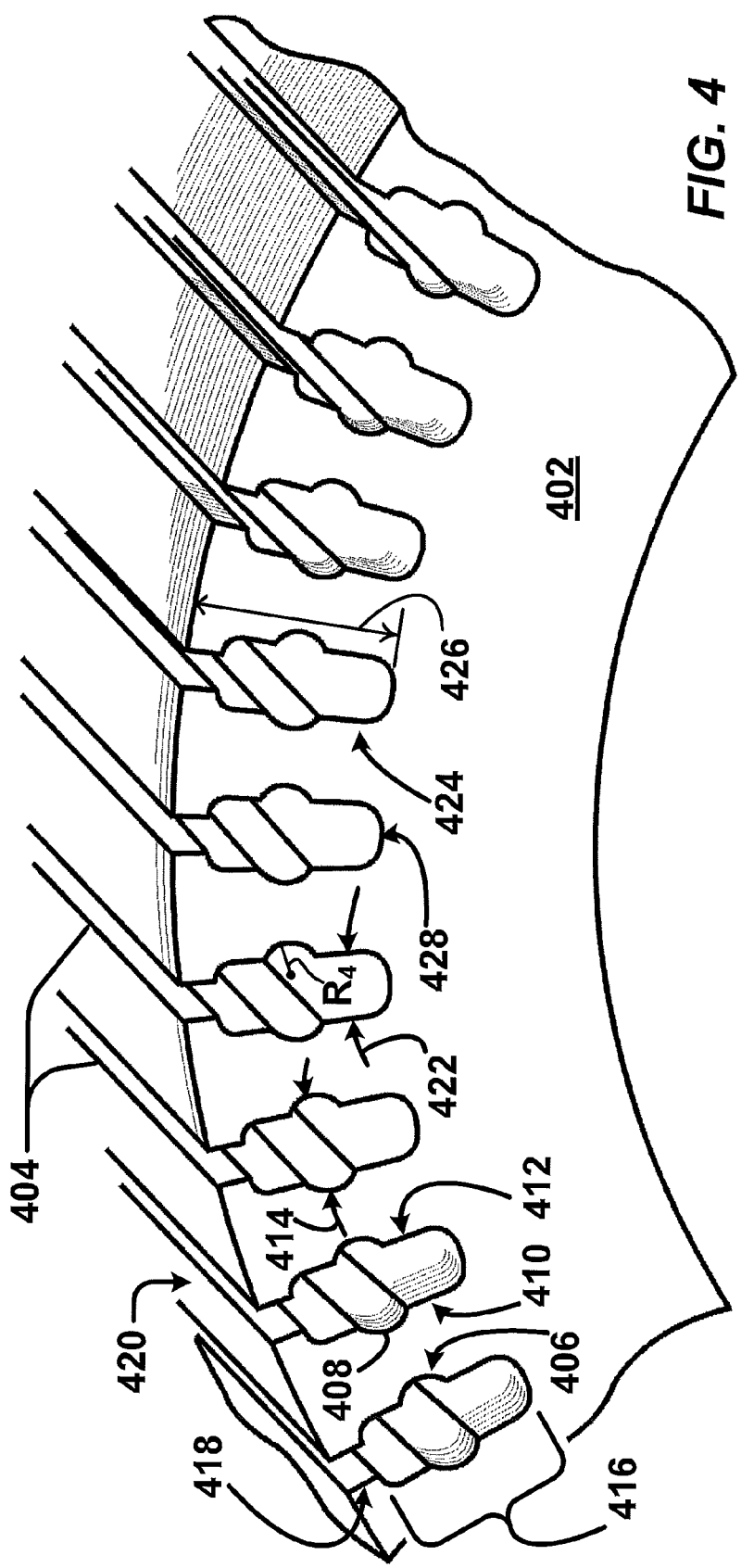
FIG. 4 is a partial cross-sectional view of another exemplary rotor core for the rotor of FIG. 1, according to an exemplary embodiment of the present disclosure.

FIG. 4 illustrates a cross section of a rotor core 402 having grooves 404 configured according to the present technology. Particularly, the grooves 404 have side walls 404 forming one or more portions of increased breadth 406. Although the walls 404 may have any of a variety of profiles without departing from the scope of the present invention, the embodiment shown in FIG. 4 shows generally planar or flat walls 404 being interrupted by the portions of increased breadth 406.

The portions of increased breadth 406 serve as localized passages of increased cross-sectional area, limiting resistance that the molten material forming the conductor bars is subject to as it flows through the groove 404. The increase in cross-sectional area of the passage also decreases an amount of time required to fill the mold (not shown in detail) with the molten material. Additionally, any discontinuities still caused by solidification shrinkage will tend to be formed in the larger sections 406 of the groove 404. Thus, material flows through the other, narrower portions of the groove 404 more continuously. In these ways, a more complete fill can be achieved, and in less time.

As provided above, characteristics of the portions of increased breadth 406, such as location, number, size, and shape of portions of increased breadth, are selected with consideration given toward reaching a desired balance between obtaining a sought high density for the conductor and shorting bars and maintaining desired power characteristics for the motor. Other factors include a time that it will take to effectively fill the resulting mold, and behavior of molten material flowing though the mold, including amount, size, and expected distribution (e.g., locations) of discontinuities in the conductor and/or shorting bars.

Portions of increased breadth 406 are formed by some sort of extension, or extended segment 408 (e.g., bow) from a primary course of a wall 410 of the groove to form a bulge, opposed by an unchanged (not shown) opposite groove wall 412, such as a generally straight or flat wall. In other cases, portions of increased breadth 406 are formed by opposing extensions 408, or bulges, in the opposing walls 410, 412 of the groove, as shown in the example of FIG. 4. Also, one or more extensions in the opposing wall may be at the same or different axial locations, or heights in the figure.

An extension 408 may be said to span an axial section of the groove, between an axially-outward end of the extension to the axially-inward end of the extension. If the extension 408 of one wall of a groove both (i) is in the same axial location and (ii) has the same axial length as an extension 408 in an opposite wall of the groove, the opposing extensions are said to be non-extensive, or not coextensive. One the other hand, when an extension 408 in one wall of a groove has at least one quality of (i) is not in the same axial location and (ii) does not have the same axial length as an extension 408 in an opposite wall of the groove, the opposing extensions are said to be non-extensive or not coextensive.

The wall extensions 408 may be configured to form portions of extended breadth 406 having any of a variety of sizes and shapes without departing from the scope of the present invention. In one contemplated embodiment, the size of the extensions 408 is selected with consideration given to a total desired extended width 414 sought. It will be appreciated that the same value for the extended width 414 can be obtained in a variety of ways.

For example, a total breadth 414 of 5 (arbitrary units), including a primary channel of 2 (units) (between the primary sides of the walls 410, 412) could be reached by (I) one extension 408 forming an extension 408 defining a lateral, or bulge, width of 1.5 (units) opposed by another extension 408 having a lateral width of 1.5 (units), (II) a single extension 408 defining a lateral width of 3 (units), (III) an extension 408 defining a lateral width of 2 (units) opposing another extension 408 defining a width of 1 (unit), etc.

Regarding shape, the extensions 408 shown in FIG. 4 are generally curved, such by being semi-circular or semi-oval. Other potential shapes include shapes having two or more sides, such as to form a triangular profile. As provided, to facilitate formation of rotor core grooves 404 and to optimize flow of molten material through the grooves, each groove, and specifically the portion(s) of increased breadth 406, can include at least one radius $R_4$.

It is contemplated that the portion of increased breadth 406 having a radius $R_4$ facilitates formation of rotor core grooves 404 and optimize flow of molten material through the grooves 404 and specifically the portion(s) of increased breadth 406.

As shown in FIG. 4, the portion(s) of increased breadth 406 is provided in a body section 416 of the groove 404, radially inward from a neck section 418 adjacent an exterior surface 420 of the rotor core 402. Because the conductor bars (e.g., 500 in FIG. 5) are formed in the grooves 404, the conductor bars will have a corresponding relatively-thin neck section (518) adjacent the rotor surface 426. In some embodiments, the neck sections 418, 518 of the grooves 404 and conductor bars 500 remain substantially the same as those shown FIGS. 2 and 3, respectively. Thus, for these embodiments, a shape and a size of a radially-outward part 519 (FIG. 5) of the conductor bar exposed at the exterior surface 420 of the rotor core 402 would remain generally the same as that 319 exposed which would be exposed in connection with FIGS. 2 and 3.

In some embodiments of the present disclosure, a width 422 of the body section 422 of the groove 404, and so a width (522 in FIG. 5) of the resulting conductor bars (500), is kept generally the same except at the localized portion(s) of increased breadth 406/506. A profile of the radially-distal, bottom part 424 of each groove 404, and bottom part 524 of the conductor bar 500, could remain generally the same as the bottom parts of the grooves and conductor bar shown in FIGS. 2 and 3.

The grooves 404 may have any of various widths 422 without departing from the scope of the present invention. Because induction motors may be made in a wide variety of sizes, the particular sizes (heights, widths, etc.) in which the rotor, and grooves and bars thereof, is not limited to only a certain size or sizes.

One or more sizes of the portion of increased breadth 406 could be selected or described in terms of a percentage of another rotor dimension, such as by being described as a multiple or percentage of the groove width 430 or a groove depth 426. For example, the width 414 of the portion of increased breadth 406, or at least one radius $R_4$ of the portion 406, could be two times, or 100%, larger than the primary or basic groove width 422. In some embodiments, the width 414 of the portion of increased breadth 406 could be designed to be or defined as being between about 120% and about 200% of the basic groove width 422 (e.g., 125%, 140%, 150%, . . . 180%, 210%, etc.). In some embodiments, the width 414 of the portion of increased breadth 406 could be designed to be or defined with respect to a fraction or percentage of the groove depth 426.

As another example at least one radius $R_4$ of the portion of increased breadth 406 could be between about 30% and about 75% of the primary groove width 422 (e.g., 25%, 30%, . . . 60%, 80%, etc.). Or the radius $R_4$ of the portion of increased breadth 406 could designed or defined as being a fraction or percentage of the groove depth 426.

It will be appreciated that the portion of increased breadth 406 can also be defined in terms of cross-section area. For instance, the portion of increased breadth 406 can be described in terms of square millimeters, square centimeters, square inches, etc.

The portion of increased breadth 406 could also be said to add a certain amount of square centimeters to the groove 404 shaped without the portion of increased breadth 406. In one embodiment, the portion of increased breadth 406 increases the cross-sectional area of the groove 404 by a certain amount, such as a certain percentage.

In cases in which the portion of increased breadth 406 includes a curve, the portion of increased breadth 406 could also be defined with respect to a radius of the curve. For instance, a radius $R_4$ of the portion of increased breadth is in some embodiments designed to be larger than half of the primary width 422 of the groove 404. While radii are described, the extended portion(s) may have any desired shape, and in some embodiments not have a constant radius. Other potential shapes include triangular and square.

In some embodiment, the portion of increased breadth is designed (e.g., shaped and sized) so that a volume (e.g., cross-sectional area) of the groove is increased as desired while minimal surface area is added to the groove. In this way, fluid flow is improved and heat transfer is decreased. With a lower surface area-to-volume, less heat is extracted from the molten material, and so less pre-solidified material is created during filling. While a goal in this embodiment is keeping down a surface area-to-volume factor in designing the portion of increased breadth, the particular shape(s) of the portion is not limited and may include any of a wide variety of shapes, including those described herein.

A depth 426 of the grooves 404 could be measured between the rotor core surface 420 and a radially-inward distal end 428 of the grooves 404 can be advantageously selected to accomplish the stated goals of facilitating effective flow of molten conductor and shorting-bar material through a rotor casting mold without over-increasing conductor-bar profiles. The depth of the groove 404 could be considered in ways other than between the core surface 420 and the distal end 428, such as being measured to cover just the body section 416—i.e., measured between the radially inward end of neck section 418 and a radially-inward distal tip 428, and so not including the neck section 418.

First Exemplary Rotor Conductor Bar

Figure 5:
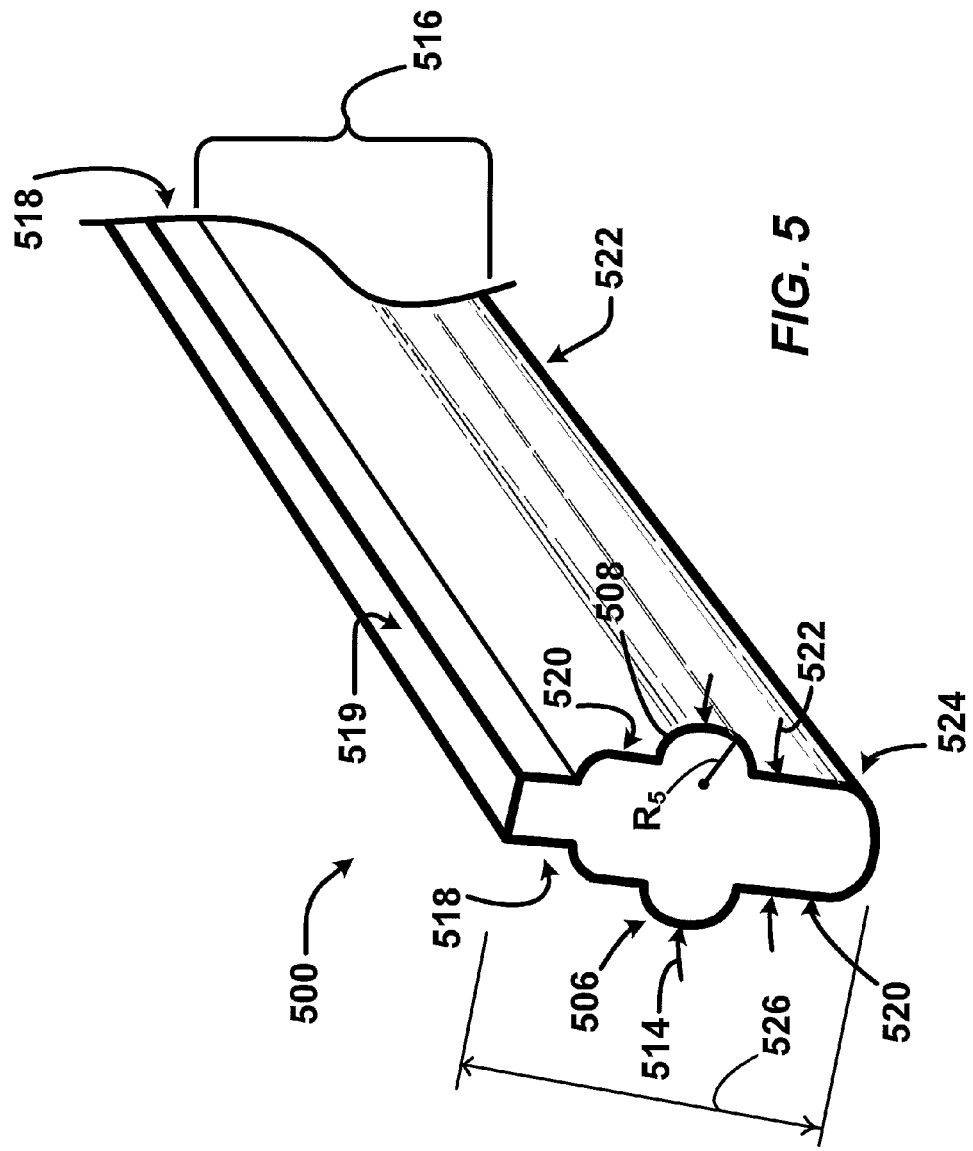
FIG. 5 is a perspective view of a conductor bar formed in grooves of the rotor core shown in FIG. 4.

FIG. 5 illustrates an exemplary conductor bar 500 formed according to an embodiment of the present invention. The conductor bar 500 extends from a first end 502 to a second end 504. The conductor bar 500 is formed in a rotor groove, such as the groove 404 of the rotor core 402 shown in FIG. 4. Accordingly, the conductor bar 500 has features corresponding to the features of the grooves 404 of FIG. 4.

For example, the conductor bar 500 has side walls 504 corresponding to the have side walls 410, 412 of the grooves 404 shown in FIG. 4. The side walls 504 of the conductor bar 500 form one or more portions of increased breadth 506 corresponding with the portions of increased breadth 406 of the rotor core 402. And, like the walls 410, 412 of the grooves 404, the walls 504 of the conductor bar 500 may have any of a variety of shapes and sizes without departing from the scope of the present invention.

Like the portions of increased breadth 406, the portions of increased breadth 506 of the conductor bar 500 can be formed by one or more extensions 508 (e.g., bow) of a wall 504 of the bar 500 forming a bulge. The extension 508 may be opposite another extension 509 in the opposite wall 504, or opposite an unbowed (i.e., flat or straight) wall section, such as a generally straight or flat wall section.

As described above, the conductor bar 500, in some embodiments, has a body section 516 adjacent a relatively-thin neck section 518 corresponding to the body and neck sections 416, 418 of the grooves 404 shown in FIG. 4.

The conductor bar 500 may be sized and shaped as further described above regarding the grooves 404 of the rotor core 402 in which the bars 500 are formed. For instance, the conductor bar 500 has a width 522 like the width 422 of the groove 404 and a height 526 corresponding to a depth 426 of the groove 404. While radii are described, the extended portion(s) may have any desired shape, and in some embodiments not have a constant radius.

Second Exemplary Rotor Core

FIG. 6 illustrates a cross section of a rotor core 602 according to another embodiment of the present technology, having grooves 604 configured according to the present technology. Particularly, the grooves 604 have side walls 610, 612 forming one or more portions of increased breadth 606.

Although the walls 604 may have any of a variety of profiles without departing from the scope of the present invention, the embodiment shown in FIG. 6 shows generally planar or flat walls 604 being interrupted by wall extensions 608 forming the portion of increased breadth 606. In some embodiments, each groove 604 includes a single portion of increased breadth 606 and in others a plurality of portions of increased breadth 606. In some embodiments, as shown in FIG. 6, the portion of increased breadth forms a bulb, being a bulbous axially-inward end of the groove 604.

The portions of increased breadth 606 are in some embodiments formed by directly-opposing extensions 608 protruding from opposing walls 610, 612. The wall extensions 608 shown in FIG. 6 are intermediate an axially outward end (top end in the figure) and axially inward end (bottom end in the figure) of the groove 604. It is contemplated that another radial location for a portion of increased breadth includes a neck section of the 618 of the groove 604.

The wall extensions 608 may be formed by at least one radius $R_6$. The wall extensions 608 may be configured to form portions of extended breadth 606 having any of a variety of sizes and profile shapes without departing from the scope of the present invention.

Considerations for us in selecting a size, shape, and location for the portions of increased depth 606 can include any of those described above regarding other embodiments. For instance, widths of opposing extensions 608 could be sized to accomplish a desired total width at the portion of increased breadth 606.

As with the embodiments described above, the portions of increased breadth 606 of the groove 604 serve as localized passages of increased flow. In these areas, the molten material forming the conductor bars 700 (shown in FIG. 7) during manufacture is subject to less resistance as it flows through the groove 604. The increase in cross-sectional area of the passage also decreases an amount of time required to fill the mold (not shown in detail) with the molten material. As also provided above, by increasing the amount of flow through these localized passages, less metal will be partially solidified during filling. And the liquid metal can also then better fill the remaining portion of the groove radially rather than axially. Thus, defects caused by poor bonding of pre-solidified metal is reduced or eliminated.

Additionally, any discontinuities still caused by solidification shrinkage will tend to be formed in the larger sections 606 of the groove 604. In these ways, as with the embodiment of FIG. 4, a more complete and improved fill can be achieved in less time.

As provided above, characteristics of the portions of increased breadth 606, such as location, number, size, and shape of portions of increased breadth, can be selected with consideration given to reaching a desired balance between obtaining high-density conductor and shorting bars and maintaining desired power characteristics for the resulting motor.

Other factors include a time that it will take to effectively fill the resulting mold, and behavior of molten material flowing though the mold, including amount, size, and expected distribution (e.g., locations) of discontinuities in the conductor and/or shorting bars.

The groove 602 of FIG. 6 could otherwise be the same as the groove 404 described above in connection with FIG. 4. Reference numbers provided in FIG. 6 but not cited above correspond to the related reference numbers (e.g., reference numbers having the same final two digits) of FIG. 4. For instance, reference number 622 refers to a primary width of the groove 604 for the rotor core shown in FIG. 4, just as the reference number 422 refers to a primary width of the groove 404 for the rotor core shown in FIG. 4.

Second Exemplary Rotor Conductor Bar

Figure 7:
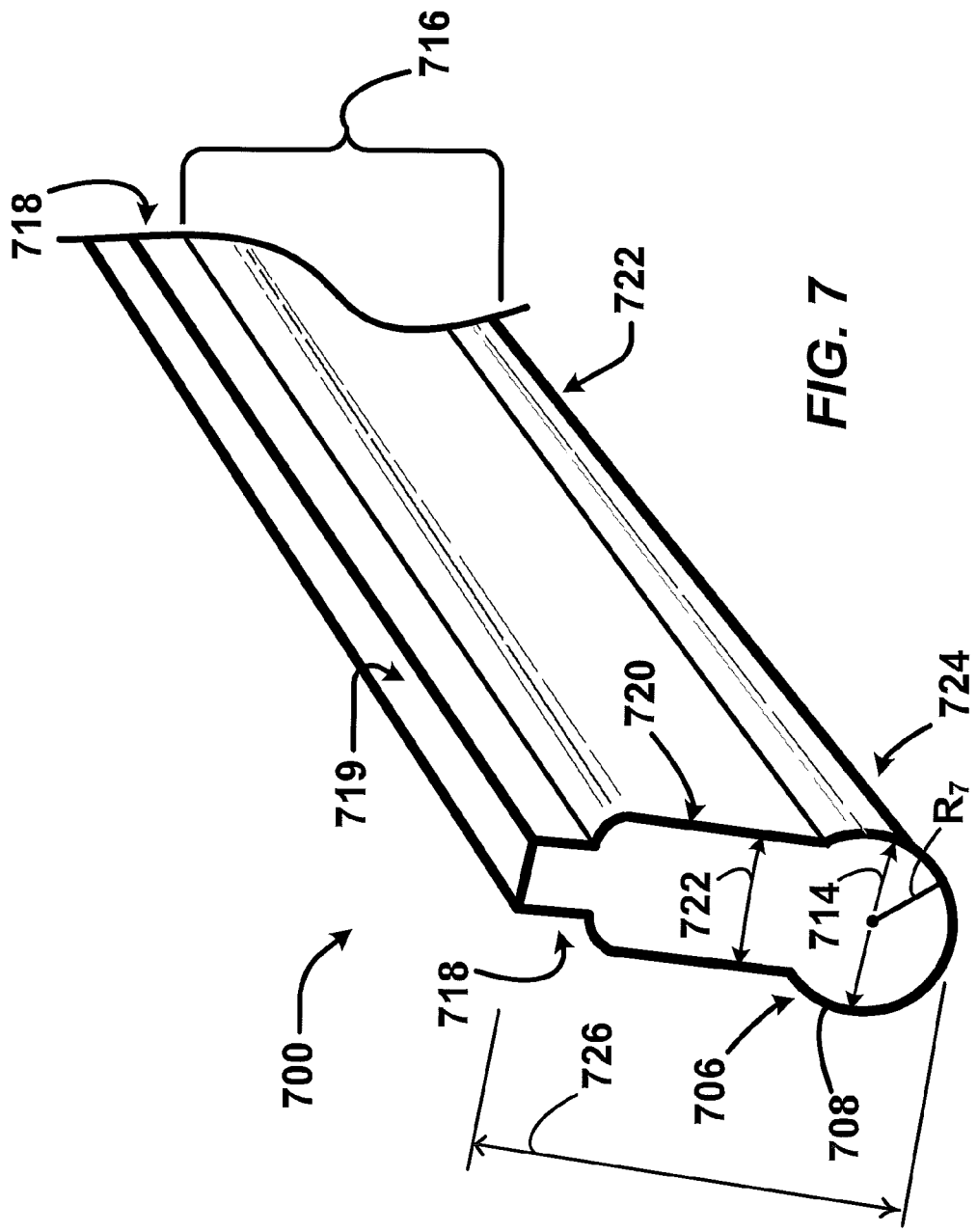
FIG. 7 is a perspective view of a conductor bar formed in grooves of the rotor core shown in FIG. 6.

FIG. 7 illustrates an exemplary conductor bar 700 formed by the groove 604 described above in connection with FIG. 6. The conductor bar 700 can include any of the characteristics of the conductor bar 500 described in connection with FIG. 5, such as size, shape, material, and considerations for selecting the same. And the conductor bar 700 has characteristics corresponding to those of the groove 604 in which it is formed.

Methods of Formation

Figure 8:
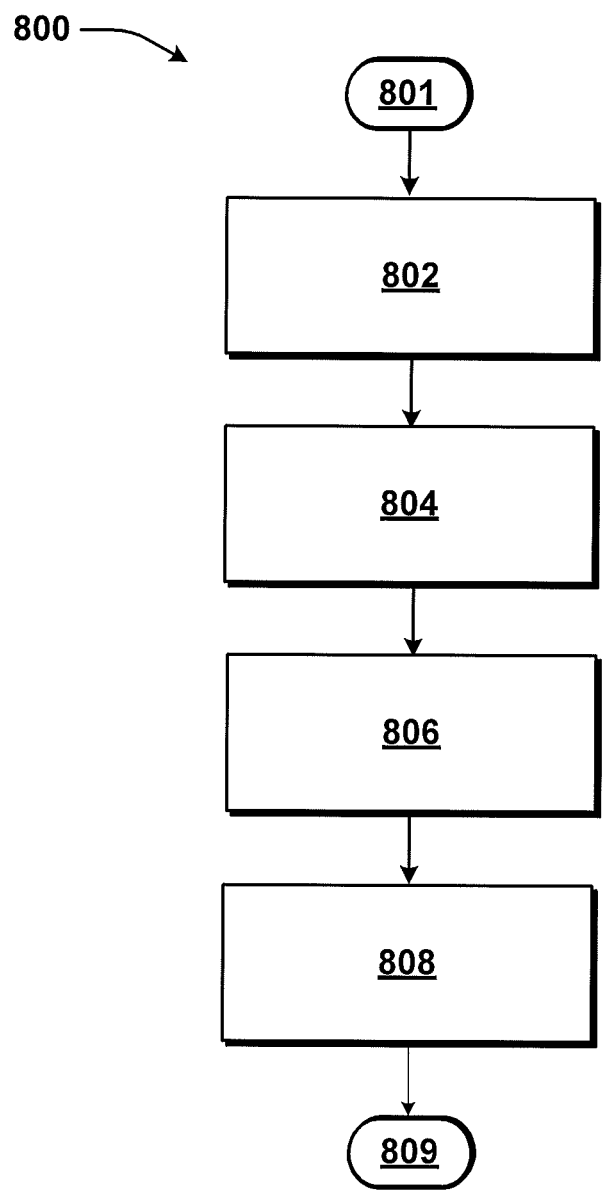
FIG. 8 illustrates an exemplary method for manufacturing a rotor according to an embodiment of the present disclosure.

FIG. 8 shows an exemplary method 800 for forming a rotor according to an embodiment of the present invention. It should be understood that the steps of the method 800 are not necessarily presented in any particular order and that performance of some or all the steps in an alternative order is possible and is contemplated.

The steps have been presented in the demonstrated order for ease of description and illustration. Steps can be added, omitted and/or performed simultaneously without departing from the scope of the appended claims. It should also be understood that the illustrated method 800 can be ended at any time.

The method 800 begins 801 and flow proceeds to block 802, whereat a rotor core 402, 602 is positioned in a die or mold. As provided above, in some embodiments, the rotor core 102 is placed in the die-casting mold at a vertical orientation—i.e., with the axis A (shown in FIG. 1) of the rotor core 102 oriented generally vertically. And in some embodiments the mold, and so rotor core is positioned, horizontally oriented for filling.

At block 804, molten material to form the conduct bars and shorting bars is introduced into the mold.

At step 806, injection is continued until the mold is full, or the injection process is otherwise determined complete. In one embodiment, the mold and rotor core are sized and shaped, and the material introduced thereto so that the material envelops, or engulfs, the rotor core in the function of block 806.

Figure 1:
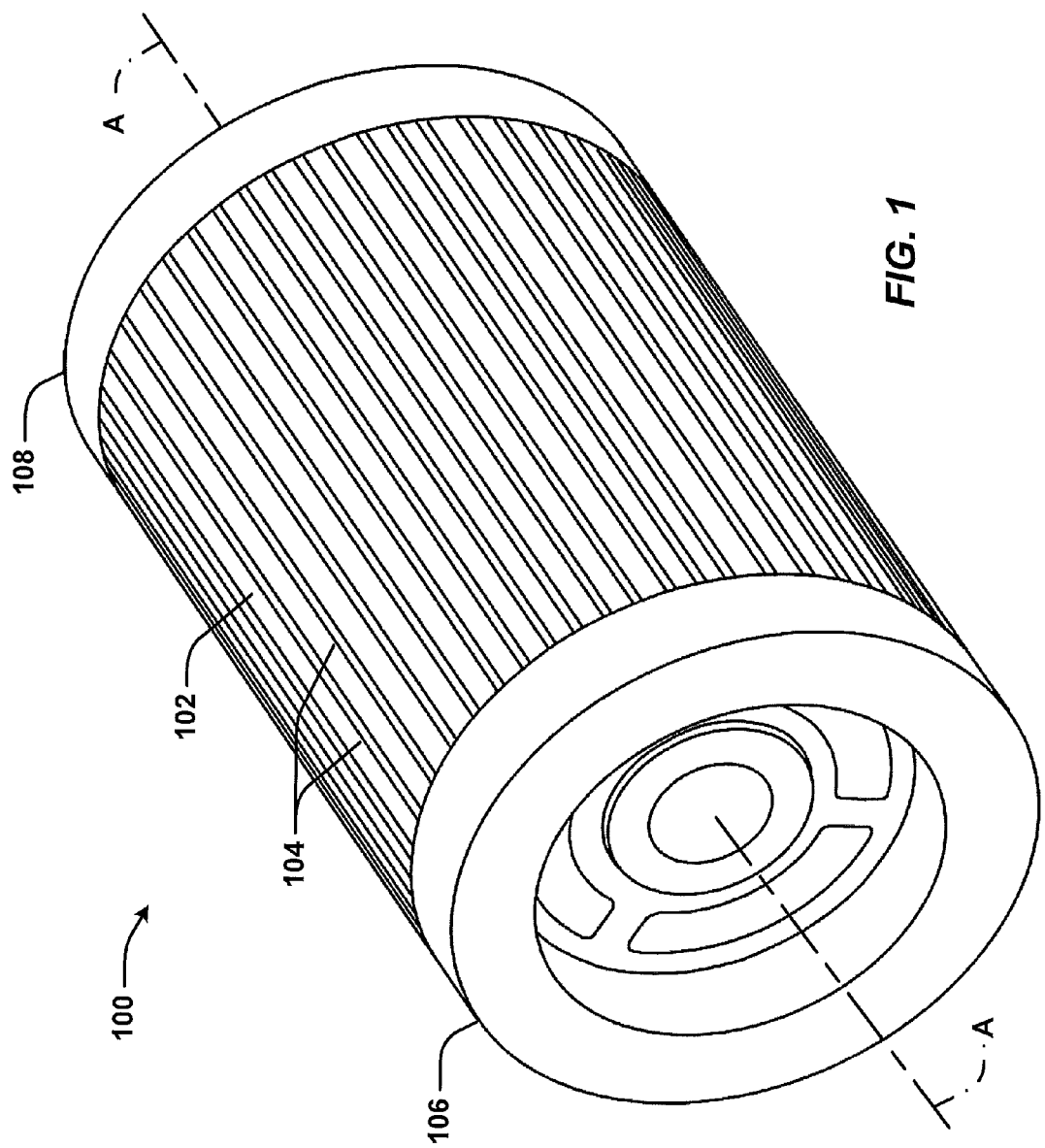
FIG. 1 is a perspective view of an exemplary rotor of an induction motor including a rotor core and capping shorting bars.

In one embodiment, at block 806 the material flows through the mold so as to first start forming a first shorting bar (e.g., a shorting bar such as the first shorting bar 106 of FIG. 1) before starting to form the conductor bar (e.g., conductor bar 500 or 700 of FIGS. 5 and 7), and then start forming the second shorting bar (e.g., a shorting bar such as the first shorting bar 108 of FIG. 1).

As part of filling the mold, the molten material flows through the slots or grooves (e.g., grooves 404, 602), the grooves being sized and shaped as described above. In this way, the benefits of the invention, including avoiding or at least limiting premature solidification of the material and decreasing fill time, are accomplished. At block 808, the molten material, now in place, is allowed to solidify. The completed rotor can now be incorporated with other rotor parts (e.g., a stator) to form the induction motor. The process may end 809.

Conclusion

The technology of the present disclosure produces rotors, and so induction motors, of increased quality. The increased quality includes an increase in power density for the motor, resulting from less premature solidification and associated shrinkage, and so conductor and shorting bars having better conductivity.

The present technology also enables the casting process to be performed in some cases at a lower cost. One way to save cost is by being able to fully inject the cast in less time, and thus save energy and enable production of more parts in a same amount of time. As provided above, the increase in cross-sectional area of the passage decreases an amount of time required to fill the mold.

Cost could also potentially be saved through lower scrap rates. That is, because rotors created according to the present teachings will have improved conductor quality, in terms of both electrical and mechanical properties, there will be less scrap in production due to rejection of inferior quality rotors. In other rwords, by improving the integrity of all of the conductors, in terms of electrical and mechanical properties, more rotors will meet specification, even heightened specifications, and so not be rejected.

Yet another benefit of the present technology is a resulting rotor having higher structural Integrity. More particularly, the improvements in metal flow, or casting, and solidification will produce parts with superior mechanical properties, including tensile strength and fatigue characteristics.

Various embodiments of the present disclosure are disclosed herein. The disclosed embodiments are merely examples that may be embodied in various and alternative forms, and combinations thereof.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A rotor core, for an induction motor, comprising:
a body that at least:
    extends radially inward from an outer surface of the body toward a central axis;
    extends axially from a first axial end to a second axial end; and
    defines a plurality of internal grooves;
wherein each of the internal grooves at least:
    includes an opening, having an opening profile width, at the outer surface of the body;
    is defined by two opposing walls;
    extends from the first axial end to the second axial end;
    extends radially between the opening at the outer surface and a radially-inward end; and
    includes a body section; and
wherein the two opposing walls comprise:
    opposing first straight and parallel segments extending radially inward, from the opening, forming a neck portion having a neck profile width equivalent to the opening profile width;
    opposing second straight and parallel segments extending radially inward, from the neck portion, forming a first primary portion having a first primary profile width being greater than the neck profile width;

opposing extended segments, extending radially inward from the first primary portion, forming an extended portion having an extended profile width being greater than the first primary profile width;

opposing curved segments meeting at the radially-inward end, forming an inward-end portion of the groove; and opposing third straight and parallel segments extending radially between the inward-end portion and the extended portion, forming a second primary portion, having a second primary profile width equivalent to the first primary profile width.

2. The rotor core of claim 1, wherein the extended profile width is between about 120% and about 200% of the first primary profile width.

3. The rotor core of claim 1, wherein the extended portion has two radii.

4. The rotor core of claim 3, wherein each radii is between about 30% and about 75% of the first primary profile width.

5. The rotor core of claim 1, wherein:
the extended portion of each groove is a first extended portion of the groove; and
each groove includes, in the body section of the groove, a second extended portion.

6. The rotor core of claim 1, wherein the walls further comprise:
first curved portions forming sharp corners with the first straight and parallel segments and connecting to the second straight and parallel segments;
second sharp corners formed by intersection of the second straight and parallel segments and the extended segments; and
third sharp corners formed by intersection of the third straight and parallel segments and the extended segments.

7. A rotor, for an induction motor, comprising:
a rotor core having a body that at least:
extends radially inward from an outer surface of the body toward a central axis;
extends axially from a first axial end to a second axial end; and
defines a plurality of internal grooves;
wherein each of the internal grooves at least:
includes an opening, having an opening profile width, at the outer surface of the body;
is defined by two opposing walls;
extends from the first axial end to the second axial end;
extends radially between the opening at the outer surface and a radially-inward end; and
includes a body section; and
wherein the two opposing walls comprise:
opposing first straight and parallel segments extending radially inward, from the opening, forming a neck portion having a neck profile width equivalent to the opening profile width;
opposing second straight and parallel segments extending radially inward, from the neck portion, forming a first primary portion having a first primary profile width being greater than the neck profile width;
opposing extended segments, extending radially inward from the first primary portion, forming an extended portion having an extended profile width being greater than the first primary profile width;
opposing curved segments meeting at the radially-inward end, forming an inward-end portion of the groove; and
opposing third straight and parallel segments extending radially between the inward-end portion and the extended portion, forming a second primary portion, having a second primary profile width equivalent to the first primary profile width.

8. The rotor of claim 7, wherein:
the extended portion of each groove is a first extended portion of the groove; and
each groove includes, in the body section of the groove, a second extended portion.

9. The rotor of claim 7, wherein the walls further comprise:
first curved portions forming first sharp corners with the first straight and parallel segments and connecting to the second straight and parallel segments;
second sharp corners formed by intersection of the second straight and parallel segments and the extended segments; and
third sharp corners formed by intersection of the third straight and parallel segments and the extended segments.

10. A rotor bar, for use in a rotor core of a rotor, comprising:
an opening surface having an opening profile width; and
two opposing walls extending from the opening surface to a point at which the walls meet;
wherein the two opposing walls comprise:
opposing first straight and parallel segments extending from the opening, surface, forming a neck portion having a neck profile width equivalent to the opening profile width;
opposing second straight and parallel segments extending from the neck portion, forming a first primary portion having a first primary profile width being greater than the neck profile width;
opposing extended segments, extending from the first primary portion toward the point at which the walls meet, forming an extended portion having an extended profile width being greater than the first primary profile width;
opposing curved segments meeting at the said point, forming an end portion; and
opposing third straight and parallel segments extending between the end portion and the extended portion, forming a second primary portion having a second primary profile width equivalent to the first primary profile width.

11. The rotor bar of claim 10, wherein the walls further comprise:
first curved portions forming first sharp corners with the first straight and parallel segments and connecting to the second straight and parallel segments;
second sharp corners formed by intersection of the second straight and parallel segments and the extended segments; and
third sharp corners formed by intersection of the third straight and parallel segments and the extended segments.

* * * * *